(12) United States Patent
Ohara et al.

(10) Patent No.: US 8,506,917 B2
(45) Date of Patent: Aug. 13, 2013

(54) GAS TREATMENT METHOD AND APPARATUS FOR CIRCULATING FLUIDIZED-BED GASIFICATION SYSTEM

(75) Inventors: Hiroaki Ohara, Tokyo (JP); Koki Hamada, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 13/383,865

(22) PCT Filed: Oct. 14, 2010

(86) PCT No.: PCT/JP2010/006105
§ 371 (c)(1),
(2), (4) Date: Jan. 13, 2012

(87) PCT Pub. No.: WO2011/048779
PCT Pub. Date: Apr. 28, 2011

(65) Prior Publication Data
US 2012/0107208 A1 May 3, 2012

(30) Foreign Application Priority Data
Oct. 23, 2009 (JP) .................................. 2009-244017

(51) Int. Cl.
*B01D 53/56* (2006.01)
*B01D 53/58* (2006.01)
*B01D 53/74* (2006.01)
*B01D 53/90* (2006.01)
*C10J 3/00* (2006.01)
*C10J 3/46* (2006.01)
*C10J 3/48* (2006.01)

(52) U.S. Cl.
USPC ........ 423/237; 423/239.1; 422/107; 422/139; 422/168; 422/169; 422/170; 422/172; 48/77; 48/111; 48/128; 48/210

(58) Field of Classification Search
USPC .............. 423/237, 239.1; 422/107, 139, 168, 422/169, 170, 172; 48/77, 111, 128, 210
See application file for complete search history.

(56) References Cited

U.S. PATENT DOCUMENTS 4,233,275 A * 11/1980 Kimura et al. ................ 423/230
5,213,587 A * 5/1993 Ekstrom et al. ............. 48/197 R (Continued)

FOREIGN PATENT DOCUMENTS

| JP | 54-132604 A | * 10/1979 |
| JP | 2000-290668 | 10/2000 |

(Continued)

OTHER PUBLICATIONS

International Search Report issued Dec. 21, 2010 in International Application No. PCT/JP2010/006105.

(Continued)

*Primary Examiner* — Timothy Vanoy
(74) *Attorney, Agent, or Firm* — Oblon, Spivak, McClelland, Maier & Neustadt, L.L.P.

(57) ABSTRACT

In a circulating fluidized-bed gasification system, an ammonia-off gas 30 from an ammonia remover 25 is fed to a catalytic denitrator 15 with a flow rate regulated such that a molar ratio of the ammonia in the ammonia off-gas 30 from the ammonia recover 25 to nitrogen oxides in an exhaust gas 6 from a combustion furnace 1 is kept within a setting range, and a reminder of the ammonia off-gas 30 is fed to the combustion furnace 1.

7 Claims, 2 Drawing Sheets

(56) References Cited

U.S. PATENT DOCUMENTS

| | | | | |
|---|---|---|---|---|
| 5,906,803 | A | * | 5/1999 | Leppalahti .................. 423/237 |
| 8,007,688 | B2 | * | 8/2011 | Dahlin et al. ................ 252/373 |

FOREIGN PATENT DOCUMENTS

| | | |
|---|---|---|
| JP | 2003-3177 | 1/2003 |
| JP | 2007-63539 | 3/2007 |
| JP | 2007-252975 | 10/2007 |
| JP | 2009-256488 | 11/2009 |

OTHER PUBLICATIONS

Japan Aromatic Industry Association, Inc., "Aromatic and Tar Industry Handbook", 3rd Edition, Mar. 2000, pp. 66-67.

* cited by examiner

GAS TREATMENT METHOD AND APPARATUS FOR CIRCULATING FLUIDIZED-BED GASIFICATION SYSTEM

TECHNICAL FIELD

The present invention relates to a gas treatment method and apparatus for a circulating fluidized-bed gasification system.

BACKGROUND ART

For production of a hydrogen-dominated gasification gas from coal or other solid fuel, a circulating fluidized-bed gasification system has been proposed which comprises, for example, a combustion furnace for burning an unreacted raw material or char with air to heat a bed material, a cyclone collector for receiving a combustion gas from the combustion furnace to collect the bed material mixed in the combustion gas and separate an exhaust gas, a gasification furnace for gasifying a raw material such as coal or biomass into an gasification gas through formation of a fluidized bed by introduction via a downcomer of the bed material collected by the cyclone collector, introduction of the raw material and introduction of water vapor as a gasifying agent and a feed passage for feeding of the bed material and the unreacted raw material or char not gasified in the gasification furnace to the combustion furnace.

The exhaust gas introduced from the combustion furnace into the cyclone collector and separated from the bed material is guided together with a reducing agent such as ammonia or urea to a catalytic denitrator with a denitration catalyst so that nitrogen oxides ($NO_x$) in the exhaust gas are decomposed into and reduced to harmless nitrogen ($N_2$) and water vapor ($H_2O$). Methods of removing the nitrogen oxides ($NO_x$) in the exhaust gas include a method of feeding ammonia or urea as a reducing agent to the catalytic denitrator under a temperature atmosphere of 350 to 400° C. to reduce the nitrogen oxides to nitrogen on the catalyst and a method of spraying ammonia or urea into a temperature atmosphere of the order of 700 to 1000° C. in the combustion furnace to reduce the nitrogen oxides to nitrogen through a non-catalytic gas phase reaction. Even if either denitration method is employed, ammonia or urea needs to be fed as a reducing agent.

On the other hand, the gasification gas produced in the gasification furnace is guided to a tar reformer disposed in a gasification gas line for tar reformation or the like and then is fed to an ammonia remover for removal of ammonia in the gasification gas. It has been known that several percent by weight or more nitrogen is contained in coal fed as a raw material to a gasification furnace and even more nitrogen is contained in the case of biomass, and therefore the gasification gas obtained by gasification of such raw material contains high concentration of ammonia which may bring about problems such as catalyst poisoning in a downstream catalytic process. Therefore, this ammonia is separated and removed by the ammonia remover.

The ammonia remover is such that the gasification gas is contacted with an absorption liquid in the form of, e.g., water in an ammonia absorption column to absorb and remove ammonia from the gasification gas and that the ammonia-absorbing absorption liquid is fed with a stripping gas such as vapor or air in an ammonia stripping column to strip and discharge the ammonia as an ammonia off-gas. The ammonia off-gas, which has a high concentration of ammonia and may bring about the catalyst poisoning problem in the downstream catalytic process, is guided to a treatment device for treatment thereof. Specifically, in the treatment device, the ammonia off-gas is burned in a combustion furnace and, for removal of nitrogen oxides resulting from the combustion, is further processed in a catalytic denitrator similar to the above-mentioned catalytic denitrator for decomposition into and reduction to harmless nitrogen ($N_2$) and water vapor ($H_2O$).

With respect to an ammonia treatment of a coke oven off-gas (COG) in the iron industry, it is described that ammonia separated is burned or recovered as liquid ammonia (Non Patent Literature 1).

In another denitration treatment, ammonia recovered from a cleaning liquid is distributively injected into gas inlet and outlet sides of a regenerated gas combustion furnace. The ammonia is burned together with a sulfuric compound in the combustion furnace for oxidative decomposition; the exhaust gas with the injected ammonia at the gas outlet side of the combustion furnace is guided to a catalytic ammonia reduction denitrator for denitration treatment while kept in high temperature (Patent Literature 1).

Citation List

Non Patent Literature

[Non Patent Literature 1] "AROMATIC AND TAR INDUSTRY HANDBOOK", 3rd Edition, pp. 66-67, The Japan Aromatic Industry Association, Inc.

Patent Literature

[Patent Literature 1] JP2000-290668A

SUMMARY OF INVENTION

Technical Problems

However, the circulating fluidized-bed gasification system has problems that, for removal of nitrogen oxides in the exhaust gas from the combustion furnace, the reducing agent such as ammonia or urea must be guided for treatment to the catalytic denitrator and that, for removal of ammonia in the gasification gas from the gasification furnace, the ammonia off-gas from the ammonia remover must be guide to and burned in a combustion furnace in a treatment device and resultant nitrogen oxides from the combustion must be reduced in a catalytic denitrator similar to the above-mentioned denitrator by feed of a reducing agent such as ammonia or urea, leading to a necessity of the large-scaled treatment device for treatment of the ammonia off-gas.

It may be conceivable that the ammonia off-gas from the ammonia remover is fed to and burned in the first-mentioned combustion furnace. However, this leads to a problem that substantial rise in concentration of the nitrogen oxides in the exhaust gas brings about substantial increase in feed rate of the reducing agent to the catalytic denitrator, further leading to a need to make the catalytic denitrator large-sized.

The invention was made in view of the above and has its object to provide a gas treatment method and apparatus for a circulating fluidized-bed gasification system capable of economically treating nitrogen oxides and ammonia in the system.

Solution to Problems

The invention is directed to a gas treatment method for a circulating fluidized-bed gasification system having a combustion furnace for burning char to heat a bed material, a cyclone collector for receiving and separating a combustion gas from said combustion furnace into a bed material and an exhaust gas, a gasification furnace for gasifying a raw material through formation of a fluidized bed by introduction of the bed material collected by the cyclone collector, introduction of the raw material and introduction of a gasifying agent and a feed passage for feeding of the bed material and the unreacted raw material or char not gasified in the gasification furnace to said combustion furnace, an exhaust gas line for discharge of the exhaust gas from said combustion furnace being provided with a catalytic denitrator with a denitration catalyst for reduction of nitrogen oxides in the exhaust gas, a gasification gas line for discharge of the gasification gas from said gasification furnace being provided with an ammonia remover comprising an ammonia absorption column for absorbing ammonia in the gasification gas through an absorption liquid and an ammonia stripping column for stripping ammonia from the absorption liquid to discharge an ammonia off-gas, the method which comprises feeding the ammonia off-gas from said ammonia remover to the catalytic denitrator with a flow rate regulated such that a molar ratio of ammonia in the ammonia off-gas from said ammonia remover to nitrogen oxides in the exhaust gas from said combustion furnace is kept within a setting range, a remainder of the ammonia off-gas being fed to the combustion furnace.

In the gas treatment method for the circulating fluidized-bed gasification system, it is preferable that the feed rate of the ammonia off-gas to the catalytic denitrator is regulated such that the molar ratio of the ammonia in said ammonia off-gas to the nitrogen oxides in the exhaust gas from said combustion furnace is within the setting range of 1.2 to 2.0.

The invention is directed to a gas treatment apparatus for a circulating fluidized-bed gasification system having a combustion furnace for burning char to heat a bed material, a cyclone collector for receiving and separating a combustion gas from said combustion furnace into a bed material and an exhaust gas, a gasification furnace for gasifying a raw material through formation of a fluidized bed by introduction of the bed material collected by the cyclone collector, introduction of the raw material and introduction of a gasifying agent and a feed passage for feeding of the bed material and the unreacted raw material or char not gasified in the gasification furnace to said combustion furnace, an exhaust gas line for discharge of the exhaust gas from said combustion furnace being provided with a catalytic denitrator with a denitration catalyst for reduction of nitrogen oxides in the exhaust gas, a gasification gas line for discharge of the gasification gas from said gasification furnace being provided with an ammonia remover comprising an ammonia absorption column for absorbing ammonia in the gasification gas through an absorption liquid and an ammonia stripping column for stripping ammonia from the absorption liquid to discharge an ammonia off-gas, the apparatus which comprises denitrator and combustion furnace passages for guiding of the ammonia off-gas from said ammonia remover to the catalytic denitrator and to the combustion furnace, respectively, flow control valves disposed in the denitrator and combustion furnace passages, respectively, a nitrogen oxides sensor for sensing nitrogen oxides in the exhaust gas at an outlet of the catalytic denitrator, an ammonia sensor for sensing ammonia in said ammonia off-gas and a controller for receiving inputs from said ammonia and nitrogen oxides sensors on sensed ammonia and sensed nitrogen oxides, respectively, to control a feed rate of the ammonia off-gas to said catalytic denitrator via the flow control valves such that a molar ratio of ammonia in the ammonia off-gas from the ammonia remover to nitrogen oxides in the exhaust gas from the combustion furnace is kept within a setting range.

Advantageous Effects of Invention

The gas treatment method and apparatus for the circulating fluidized-bed gasification system of the invention can provide advantageous effects. The ammonia off-gas from the ammonia remover is fed to the catalytic denitrator with the flow rate regulated such that the molar ratio of the ammonia in the ammonia off-gas from the ammonia remover to the nitrogen oxides in the exhaust gas from the combustion furnace is kept within the setting range, the remainder of the ammonia off-gas being fed to the combustion furnace. Thus, the ammonia off-gas from the ammonia remover can be effectively utilized for economical reduction of nitrogen oxides by the catalytic denitrator. Furthermore, even if nitrogen oxides in the exhaust gas may be increased by feeding the remainder of the ammonia off-gas to the combustion furnace, the feed rate of the ammonia off-gas to the catalytic denitrator is automatically regulated such that the molar ratio of the ammonia in the ammonia off-gas to the nitrogen oxides in the exhaust gas from the combustion furnace is kept within the setting range, which prevents increase of nitrogen oxides at the outlet of the catalytic denitrator.

DESCRIPTION OF EMBODIMENT

An embodiment of the invention will be described with reference to the drawings.

Figure 1:
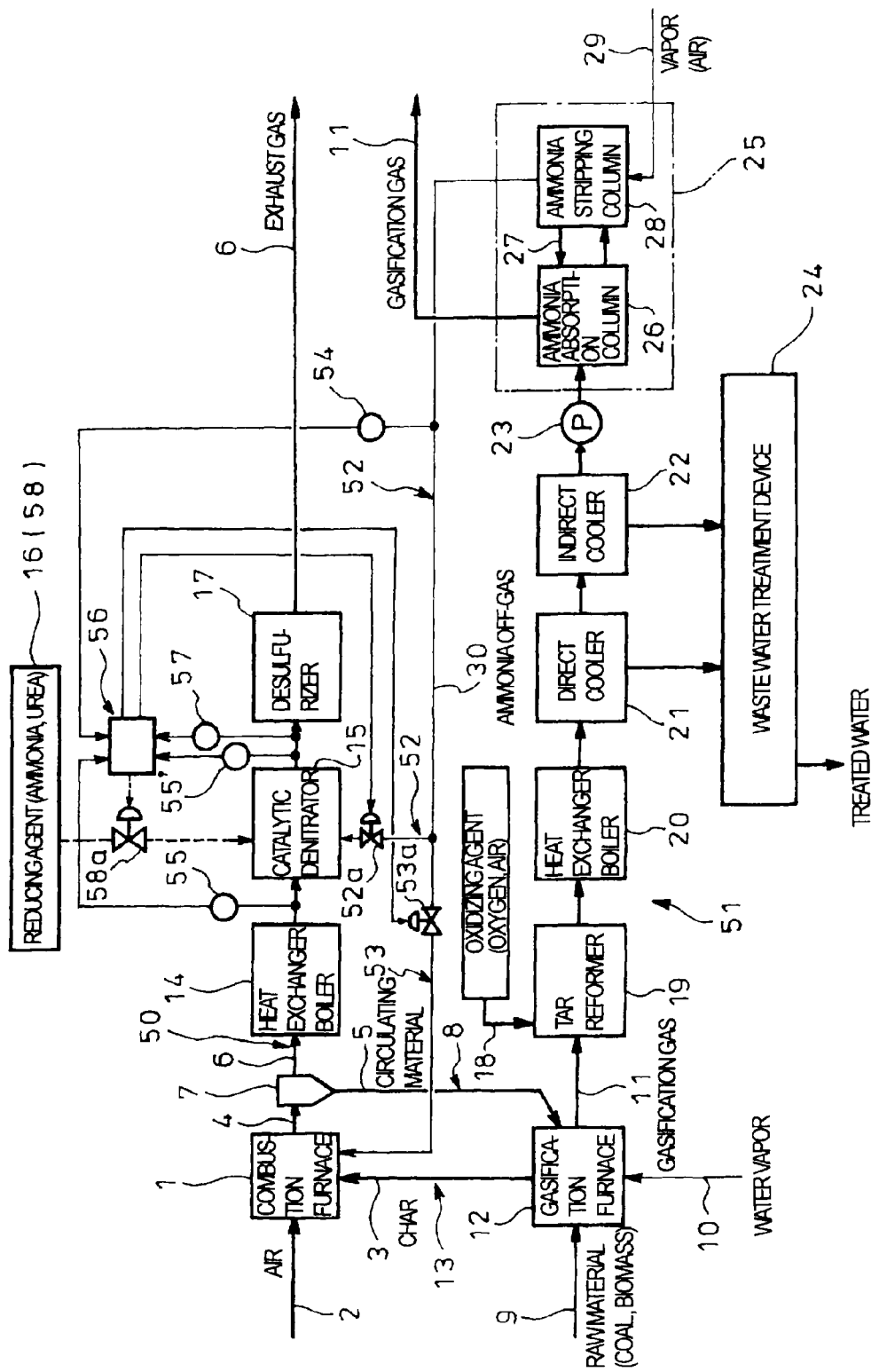
FIG. 1 is a block diagram showing an embodiment of a gas treatment apparatus for a circulating fluidized-bed gasification system according to the invention.

FIG. 1 is a block diagram showing the embodiment of a gas treatment apparatus for a circulating fluidized-bed gasification system according to the invention. Firstly, description will be made on the circulating fluidized-bed gasification system in FIG. 1 to which the invention is applied. As described above, it comprises a combustion furnace 1 for burning an unreacted raw material or char 3 with air 2 to heat a bed material, a cyclone collector 7 for receiving a combustion gas 4 from the combustion furnace 1 to collect a bed material 5 mixed in the combustion gas 4 from the combustion furnace 1 and separate an exhaust gas 6, a gasification furnace 12 for gasifying a raw material 9 such as coal or biomass into an gasification gas 11 through formation of a fluidized bed by introduction via a downcomer 8 of the bed material 5 collected by the cyclone collector 7, introduction of the raw material 9 and introduction of water vapor 10 as a gasifying agent and a feed passage 13 for feeding of the bed material and the unreacted raw material or chair 3 not gasified in the gasification furnace 12 to the combustion furnace 1.

The exhaust gas 6 guided from the combustion furnace 1 to the cyclone collector 7 and separated from the bed material 5 is guided for heat recovery to a heat exchanger boiler 14 disposed in an exhaust gas line 50 and then is guided together with a reducing agent 16 such as ammonia or urea to a catalytic denitrator 15 with a denitration catalyst so that nitrogen oxides ($NO_x$) in the exhaust gas are decomposed into and reduced to harmless nitrogen ($N_2$) and water vapor ($H_2O$). The exhaust gas 6 resulting from burning of the char 3 in the combustion furnace 1 contains several hundred ppm (several grams/kilogram-fuel) of nitrogen oxides ($NO_x$), so that there is a need to reduce the amount of the nitrogen oxides in the exhaust gas 6 to or below a specified value using the catalytic denitrator 15. A wet- or dry-type desulfurizer 17 is disposed downstream of the catalytic denitrator 15 to remove sulfur oxides ($SO_x$).

Methods of removing nitrogen oxides ($NO_x$) in the exhaust gas 6 include a method of feeding ammonia or urea as the reducing agent 16 under a temperature atmosphere of 350 to 400° C. to reduce the nitrogen oxides to nitrogen on a catalyst using the catalytic denitrator 15 shown in FIG. 1 and a method of spraying ammonia or urea into a temperature atmosphere of the order of 700 to 1000° C. in the combustion furnace 1 to reduce the nitrogen oxides to nitrogen through a non-catalytic gas phase reaction. Even if either denitration method is employed, ammonia or urea needs to be fed as the reducing agent 16.

The gasification gas 11 produced in the gasification furnace 12 is guided to a tar reformer 19 disposed in a gasification gas line 51 to reform tar therein by heating the gasification gas 11 to e.g., 1000° C. or more through feeding of an oxidizing agent 18 such as oxygen or air. Thereafter, the gasification gas 11 is fed into a heat exchanger boiler 20 for heat recovery and then into a direct cooler 21 composed of a spray column to cool the gasification gas 11 down to e.g., about 70° C. The direct cooler 21 removes ash in the gasification gas 11 and tar not reformed by the tar reformer 19. Subsequently, the gasification gas 11 is fed into an indirect cooler 22 which, to prevent a problem that tar not removed by the direct cooler 21 may adhere to an induced draft fan 23 and the like arranged downstream, further cools the gasification gas 11 down to e.g., 40° C. to remove the tar. Reference numeral 24 denotes a wastewater treatment device which treats wastewater from the coolers 21 and 22.

An ammonia remover 25 is disposed downstream of the indirect cooler 22 to remove ammonia in the gasification gas 11. It has been known that several percent by weight or more nitrogen is contained in coal fed as the raw material 9 to the gasification furnace 12 and even more nitrogen is contained in the case of biomass, and therefore the gasification gas obtained by gasification of such raw material 9 contains high concentration of ammonia which may bring about a problem of catalyst poisoning in a downstream catalytic process. Therefore, this ammonia is separated and removed by the ammonia remover 25.

The ammonia remover 25 is such that the gasification gas 11 is contacted with an absorption liquid 27 in the form of, e.g., water in an ammonia absorption column 26 to absorb and remove ammonia from the gasification gas 11 and that the ammonia-absorbing absorption liquid 27 is fed with an stripping gas 29 such as steam or air in an ammonia stripping column 28 to strip and discharge the ammonia as an ammonia off-gas 30.

The ammonia off-gas 30, which has a high concentration of ammonia and may bring about the catalyst poisoning problem in the downstream catalytic process, was guided to a treatment device for the treatment thereof. Specifically, in the treatment device, the ammonia off-gas 30 was guided to and burned in a combustion furnace (not shown) and, in order to remove nitrogen oxides resulting from the combustion, was further processed in a catalytic denitrator similar to the catalytic denitrator 15 for decomposition into and reduction to harmless nitrogen ($N_2$) and water vapor ($H_2O$).

In the embodiment of the invention, the ammonia off-gas 30 from the ammonia remover 25 disposed in the gasification gas line 51 is guided to the catalytic denitrator 15 and combustion furnace 1 through denitrator and combustion furnace passages 52 and 53 having flow control valves 52*a* and 53*a* and disposed in the exhaust gas line 50, respectively.

An ammonia sensor 54 is disposed at an outlet of the ammonia remover 25 to sense a concentration of ammonia in the ammonia off-gas 30. A nitrogen oxides sensor 55 is disposed at an inlet of the catalytic denitrator 15 to sense the concentration of nitrogen oxides in the exhaust gas 6. Values of ammonia and nitrogen oxides sensed by the sensors 54 and 55 are inputted to a controller 56. The controller 56 controls the flow control valves 52*a* and 53*a* such that a molar ratio ($NH_3/NO_x$) of ammonia in the ammonia off-gas 30 to nitrogen oxides in the exhaust gas 6 from the combustion furnace 1 is kept within a setting range, thereby regulating a feed rate of the ammonia off-gas 30 to the catalytic denitrator 15, a remainder of the ammonia off-gas 30 being fed to the combustion furnace 1.

A leaked ammonia sensor 57 is disposed at an outlet of the catalytic denitrator 15 to sense leaked ammonia in the exhaust gas 6 and the controller 56 receives an input from the sensor 57 on leaked ammonia sensed. When a sensed value of leaked ammonia by the sensor 57 rises in the state that the feed rate of the ammonia off-gas to the catalytic denitrator 15 is regulated in terms of the molar ratio as mentioned in the above, lowering of denitration performance in the catalytic denitrator 15 can be determined by the controller 56. When the rise in amount of leaked ammonia is sensed by the sensor 57, the flow control valves 52*a* and 53*a* are controlled to increase the feed rate of the ammonia off-gas to the catalytic denitrator 15 in preference to the above-mentioned control based on the molar ratio, ensuring that leakage of ammonia is maintained under an environmental standard value. A nitrogen oxides sensor 55' is also disposed at the outlet of the catalytic denitrator 15 so that denitration performance of the catalytic denitrator 15 can be checked by sensing nitrogen oxides in the exhaust gas 6.

An auxiliary adding device 58 for addition of the reducing agent 16 such as ammonia or urea is connected via a flow control valve 58*a* to the catalytic denitrator 15. Thus, for example upon startup of the circulation fluidized-bed gasification system where no ammonia off-gas 30 is obtained from the ammonia remover 25, the flow control valve 58*a* is regulated to auxiliary feed the reducing agent 16 to the catalytic denitrator 15 for denitration of the exhaust gas 6.

Next, an operation of the embodiment will be described.

In the combustion furnace 1 of the circulating fluidized-bed gasification system of FIG. 1, the unreacted raw material or char 3 is burned to generate nitrogen oxides due to a slight nitrogen content in the char 3 and nitrogen in the air in a combustion field of e.g., 700 to 1000° C. The combustion gas 4 from the combustion furnace 1 is separated in the cyclone collector 7 into the bed material 5 and the exhaust gas 6, the latter being guided through the exhaust gas line 50 to the heat exchanger boiler 14 and then to the catalytic denitrator 15 for removal of the nitrogen oxides.

On the other hand, in the gasification furnace 12 of the circulating fluidized-bed gasification system, the raw material 9 such as coal or biomass is gasified into the gasification gas 11 together with which most of the nitrogen content in the raw material 9 is drawn as ammonia gas through the gasification gas line 51 and passes through the tar reformer 19, the heat exchanger boiler 14, the direct cooler 21, the indirect cooler 22, etc., into the ammonia remover 25 where ammonia is absorbed by the absorption liquid 27 in the ammonia absorption column 26 and then the ammonia-absorbing absorption liquid 27 is guided to the ammonia stripping column 28 for stripping of ammonia to obtain the ammonia off-gas 30.

The ammonia off-gas 30 thus obtained by the ammonia stripping column 28 is fed via the denitrator passage 52 and the flow control valve 52a into the catalytic denitrator 15 and via the combustion furnace passage 53 and the flow control valve 53a into the combustion furnace 1.

Then, the concentration of ammonia in the ammonia off-gas 30 sensed by the sensor 54 disposed at the outlet of the ammonia remover 25 and the concentration of nitrogen oxides in the exhaust gas 6 sensed by the sensor 55 disposed at the inlet of the catalytic denitrator 15 are inputted to the controller 56, so that the controller 56 controls the flow control valves 52a and 53a to regulate the flow rate of the ammonia off-gas 30 fed to the catalytic denitrator 15 so as to keep within a setting range the molar ratio ($NH_3/NO_x$) of ammonia in the ammonia off-gas 30 to nitrogen oxides in the exhaust gas 6 from the combustion furnace 1, a remainder of the ammonia off-gas 30 being fed to the combustion furnace 1.

The exhaust gas 6 resulting from the combustion of the char 3 as shown in FIG. 1 contains several hundred ppm (several grams/kilogram-fuel) of nitrogen oxides ($NO_x$).

Figure 2:
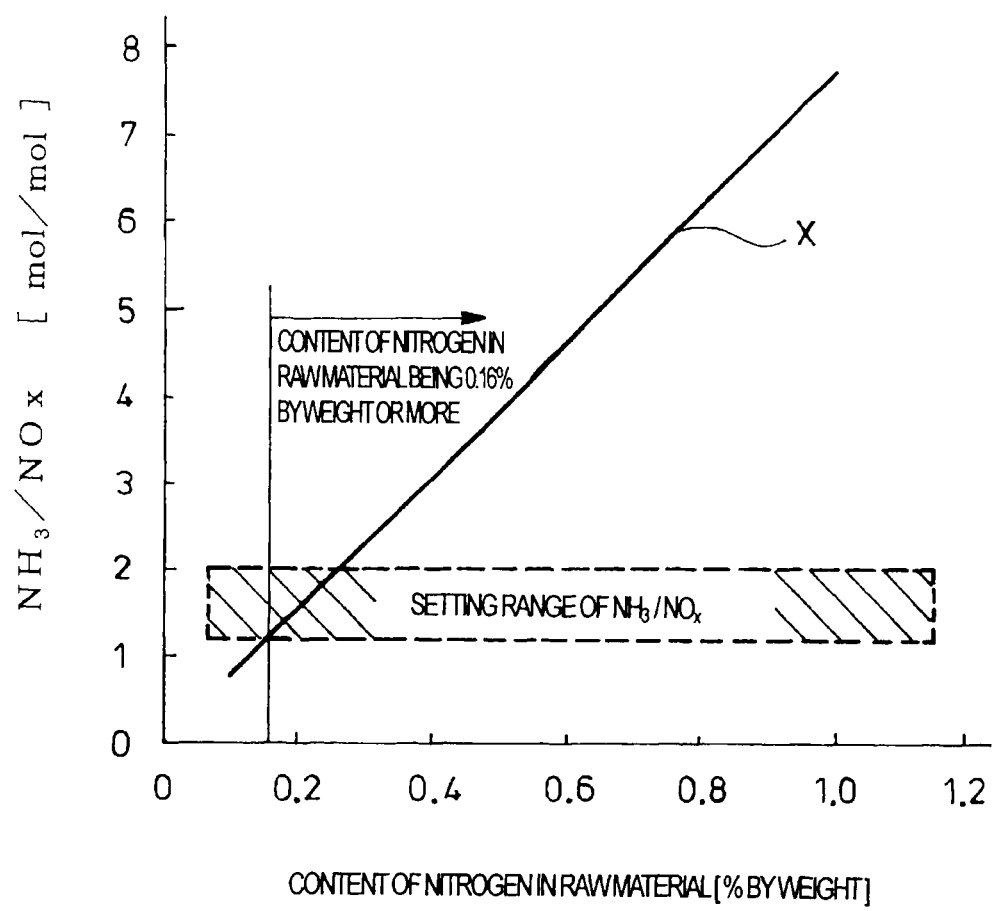
FIG. 2 is a graph showing a relationship between a content of nitrogen (N) in a raw material and a molar ratio of ammonia in an ammonia off-gas to nitrogen oxides in an exhaust gas from a combustion furnace.

On the other hand, when the solid raw material 9 having the content of nitrogen (N) of 0.1 to 1.2% by weight as shown in FIG. 2 was fed to the gasification furnace 12 for gasification, an amount of ammonia recovered from the gasification gas 11 by the ammonia remover 25 was several grams/kilogram-fuel or more and the molar ratio X ($NH_3/NO_x$) of ammonia recovered from the gasification gas 11 to nitrogen oxides generated in the combustion furnace 1 was of the order of 0.5 to 8.0.

It has become apparent for satisfactory denitration by the catalytic denitrator 15 that it is important to control the feeding of ammonia so as to keep within a range of 1.2 to 2.0 the molar ratio of ammonia in the ammonia off-gas 30 to nitrogen oxides in the exhaust gas 6 from the combustion furnace 1 and that ammonia sufficient to keep the molar ratio of 1.2 to 2.0 can be fed when the content of the nitrogen (N) in the raw material is 0.16% by weight or more. If the molar ratio is less than 1.2, $NO_x$ appears in the unreacted state. If the molar ratio exceeds 2.0, ammonia remains left excessively.

It has been known that several percent by weight or more (e.g., 2% by weight or more) of nitrogen is contained in coal fed as the raw material 9 to the gasification furnace 12 and that even more nitrogen is contained in the case of biomass, and therefore it is clear that gasification of the coal or biomass as the raw material 9 brings about ammonia enough for reducing nitride oxides in the exhaust gas 6 by the catalytic denitrator 15.

As described above, the ammonia off-gas 30 from the ammonia remover 25 is supplied to the catalytic denitrator 15 with the feed rate regulated by controller 56 through the flow control valves 52a and 53a such that the molar ratio of ammonia in the ammonia off-gas 30 from the ammonia remover 25 to nitrogen oxides in the exhaust gas 6 from the combustion furnace 1 is kept within the setting range of 1.2 to 2.0, the remainder of the ammonia off-gas 30 being supplied to the combustion furnace 1. Thus, the ammonia off-gas 30 from the ammonia remover 25 can be effectively utilized for economical reduction of nitrogen oxides by the catalytic denitrator 15.

Furthermore, even if the nitrogen oxides in the exhaust gas 6 may be increased by feeding the remainder of the ammonia off-gas 30 to the combustion furnace 1, the feed rate of the ammonia off-gas to the catalytic denitrator is automatically regulated such that the molar ratio of the ammonia in the ammonia off-gas 30 to nitrogen oxides in the exhaust gas 6 from the combustion furnace 1 is kept within the setting range of 1.2 to 2.0, which prevents increase of nitrogen oxides at the outlet of the catalytic denitrator 15.

Upon startup of the circulating fluidized-bed gasification system, the bed material 5 is first heated by the combustion furnace 1; however, gasification is not yet performed by the gasification furnace 12 and hence the ammonia off-gas 30 is not obtained from the ammonia remover 25. Accordingly, upon the startup, the flow control valve 58a is regulated on the basis of the concentration of the nitrogen oxides sensed by the nitrogen oxides sensor 55 to feed the reducing agent 16 from the auxiliary adding device 58 to the catalytic denitrator 15, thereby enabling the reduction of nitrogen oxides in the exhaust gas 6.

The leaked ammonia sensor 57 is disposed at the outlet of the catalytic denitrator 15 to sense the leaked ammonia in the exhaust gas 6 and the controller 56 receives the input from the sensor 57 on the leaked ammonia sensed. When the sensed value of the leaked ammonia by the sensor 57 rises in the state that the feed rate of the ammonia off-gas to the catalytic denitrator 15 is regulated in terms of the molar ratio as mentioned in the above, lowering of denitration performance in the catalytic denitrator 15 can be determined by the controller 56. Thus, the flow control valves 52a and 53a can be controlled to increase the feed rate of the ammonia off-gas 30 to the catalytic denitrator 15 in preference to the control based on the molar ratio such that the leakage of ammonia is maintained under the environmental standard value, which prevents problems such as leaking of a high concentration of ammonia from the catalytic denitrator 15. Such lowering of denitration performance in the catalytic denitrator 15 brings about increase of the nitrogen oxides sensed at the outlet of the catalytic denitrator 15 by the nitrogen oxides sensor 55', so that the lowering of the denitration performance can be also determined from this; maintenance such as renewal or replacement of the catalyst of the catalytic denitrator 15 can be conducted based on the determined lowering of the denitration performance.

It is to be understood that a gas treatment method and apparatus for a circulating fluidized-bed gasification system according to the invention is not limited to the above embodiment and that various changes and modifications may be made without departing from the scope of the invention.

Reference Signs List
    1 combustion furnace
    3 char
    4 combustion gas
    5 bed material
    6 exhaust gas
    7 cyclone collector
    9 raw material
    10 water vapor (gasifying agent)
    11 gasification gas
    12 gasification furnace
    13 feed passage
    15 catalytic denitrator
    25 ammonia remover
    26 ammonia absorption column
    27 absorption liquid
    28 ammonia stripping column
    30 ammonia off-gas
    50 exhaust gas line
    51 gasification gas line
    52 denitrator passage
    52a flow control valve
    53 combustion furnace passage
    53a flow control valve
    54 ammonia sensor
    55 nitrogen oxide sensor
    56 controller
    57 leaked ammonia sensor

INDUSTRIAL APPLICABILITY

A gas treatment method and apparatus for a circulating fluidized-bed gasification system of the invention can economically treat with nitrogen oxides and ammonia generated in the system.

The invention claimed is:

1. A gas treatment method for a circulating fluidized-bed gasification system,
the circulating fluidized-bed gasification system comprising:
a combustion furnace in a cyclic material flow communication with a cyclone collector and a gasification furnace;
a catalytic denitrator in material communication with the cyclone collector;
an ammonia remover in material communication with the gasification furnace;
wherein
the ammonia remover is in material communication via control valves with the catalytic denitrator and the combustion furnace; and
the method is conducted in the circulating fluidized-bed gasification system in a sequence of operations, comprising:
introducing a raw material and gasifying agent to the gasification furnace;
adding a bed material to the gasification furnace to form a fluidized bed;
gasifying a portion of the raw material over the fluidized bed
passing gasified raw material to the ammonia remover to separate ammonia,
passing char, raw material not gasified and bed material from the gasification furnace to the combustion furnace,
adding an oxygen comprising gas to the combustion furnace to oxidize the raw material to obtain a gaseous oxidation mixture comprising nitrogen oxides,
passing the oxidation mixture to the cyclone collector to separate bed material from the gaseous oxidation mixture and returning the separated bed material to the gasification furnace,
passing the oxidation mixture as an exhaust to the catalytic denitrator,
feeding gaseous ammonia separated in the ammonia remover to the catalytic denitrator,
catalytically reducing the nitrogen oxides to nitrogen with the ammonia,
wherein a flow rate of the ammonia to the catalytic denitrator is regulated such that a molar ratio of ammonia from the ammonia remover to nitrogen oxides in the exhaust gas from combustion furnace is kept within a setting range, a remainder of the ammonia off-gas being fed to the combustion furnace.

2. The gas treatment method for the circulating fluidized-bed gasification system as claimed in claim 1, wherein the setting range of the feed rate of the gaseous ammonia to the catalytic denitrator is regulated such that a molar ratio of the ammonia to the nitrogen oxides in the exhaust gas from the combustion furnace is from 1.2/1 to 2.0/1.

3. The gas treatment method for a circulating fluidized-bed gasification system of claim 1 further comprising removing sulfur oxides from an exhaust gas of the catalytic denitrator.

4. The gas treatment method for a circulating fluidized-bed gasification system of claim 3, wherein the removal of sulfur oxides comprises a wet process or a dry process.

5. The gas treatment method for a circulating fluidized-bed gasification system of claim 1 further comprising a reforming treatment of tar in the gasified raw material from the gasification furnace prior to ammonia removal; wherein the gasification raw material is treated with an oxidizing gas at a temperature of 1000° C. or greater.

6. A gas treatment apparatus for a circulating fluidized-bed gasification system, comprising:
a combustion furnace in a cyclic material flow communication with a cyclone collector and a gasification furnace;
a catalytic denitrator in material communication with the cyclone collector via an exhaust gas line from the combustion furnace to the cyclone collector and then to the catalytic denitrator, the denitrator comprising a denitration catalyst for reduction of nitrogen oxides;
an ammonia remover in material communication with the gasification furnace via a gas discharge line and in material communication with both the catalytic denitrator and the combustion furnace via an ammonia off-gas line;
a nitrogen oxides sensor in an exhaust gas line at an outlet of the catalytic denitrator,
an ammonia sensor in the ammonia off-gas line from the ammonia remover, and
a controller which receives inputs from the ammonia and nitrogen oxides sensors on sensed ammonia and sensed nitrogen oxides, and controls ammonia flow into the denitrator,
wherein
the ammonia remover comprises an ammonia absorption column with an absorption liquid and an ammonia stripping column for stripping ammonia from the absorption liquid to discharge an ammonia off-gas, and
the gasification furnace comprises a fluidized bed material.

7. The gas treatment apparatus for a circulating fluidized-bed gasification system of claim 6, further comprising at least one operational unit selected from a desulfurizing unit in material communication with and downstream of the catalytic denitrator and a tar reformer between the gasification furnace and the ammonia remover.

* * * * *